Figure 1:
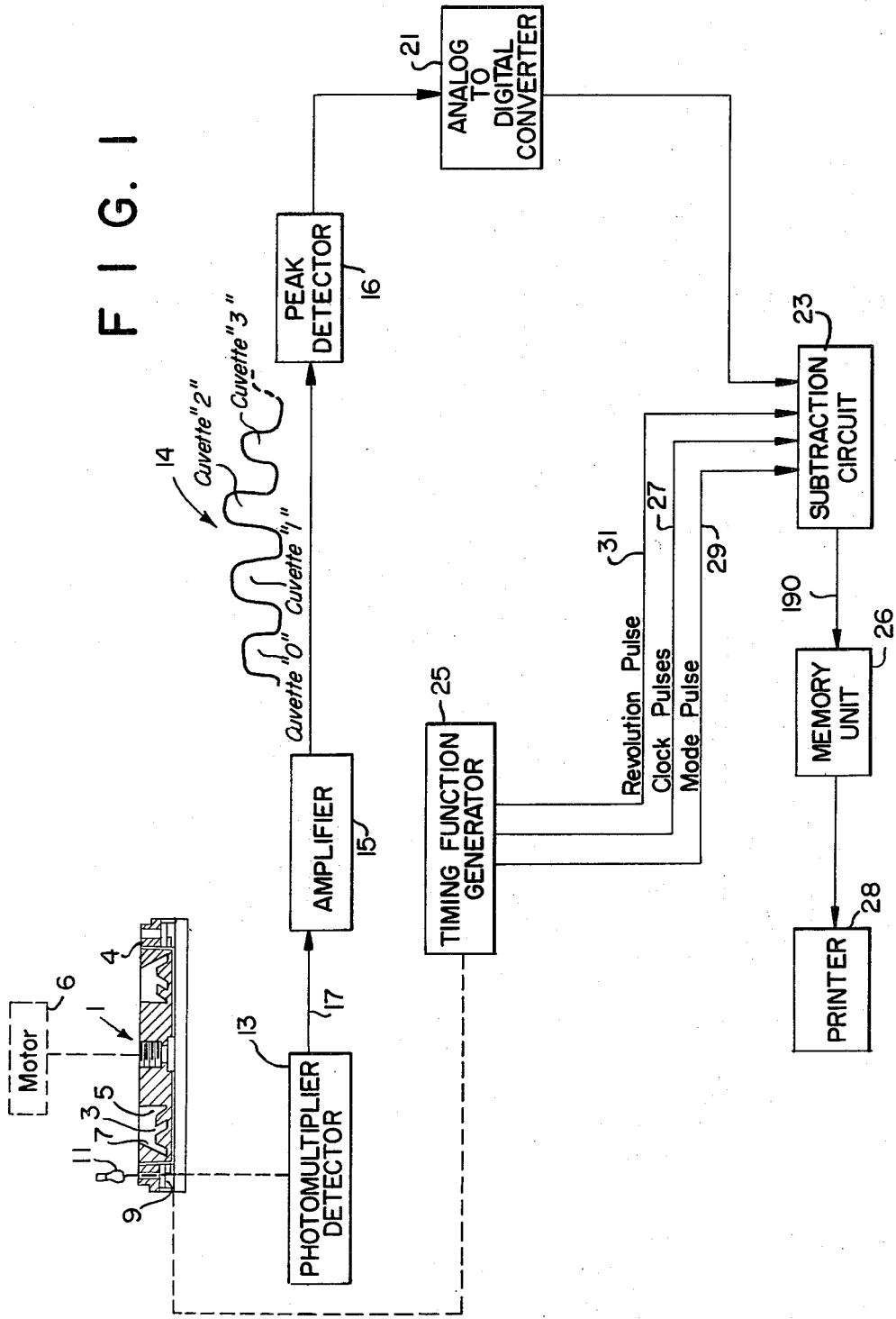

United States Patent [19]

Picunko et al.

[11] 3,817,632

[45] June 18, 1974

[54] DIGITAL SUBTRACTION CIRCUIT FOR A CENTRIFUGAL CHEMICAL ANALYZER OF THE ROTATING SPECTROPHOTOMETER TYPE

[75] Inventors: Thomas Picunko, Bronxville; Marvin C. Stewart, Hempstead, both of N.Y.

[73] Assignee: Union Carbide Corporation, New York, N.Y.

[22] Filed: Sept. 21, 1972

[21] Appl. No.: 291,050

[52] U.S. Cl. .................................. 356/39, 356/205
[51] Int. Cl. ......................................... G01n 33/16
[58] Field of Search ............. 356/39, 205; 324/99 D

[56] References Cited
UNITED STATES PATENTS

| | | | |
|---|---|---|---|
| 3,586,484 | 6/1971 | Anderson | 356/39 |
| 3,617,885 | 11/1971 | Wheable | 324/99 |
| 3,634,868 | 1/1972 | Pelavin et al. | 356/39 |
| 3,659,946 | 5/1972 | Kozawa et al. | 356/208 |
| 3,669,551 | 6/1972 | Bucher et al. | 356/205 |
| 3,681,029 | 8/1972 | Shapiro | 356/39 |
| 3,697,185 | 10/1972 | Kassel et al. | 356/205 |

*Primary Examiner*—Ronald L. Wibert
*Assistant Examiner*—Paul K. Godwin
*Attorney, Agent, or Firm*—Fredrick J. McCarthy, Jr.

[57] ABSTRACT

Known rotating spectrophotometers have a series of cuvets arranged concentrically around a horizontally rotatable disc so that when the disc is rotated, centrifugal force mixes and transfers reagents and samples to the cuvets. As each cuvet passes a light source, the absorbance of each individual sample is detected and measured photometrically, and is converted to an electrical signal pulse.

A digital subtraction circuit is provided for use with a centrifugal chemical analyzer of the rotating spectrophotometer type wherein the light absorbance value of a reference cuvette of the analyzer is subtracted from the light absorbance values of each of the other cuvettes of the analyzer.

1 Claim, 6 Drawing Figures

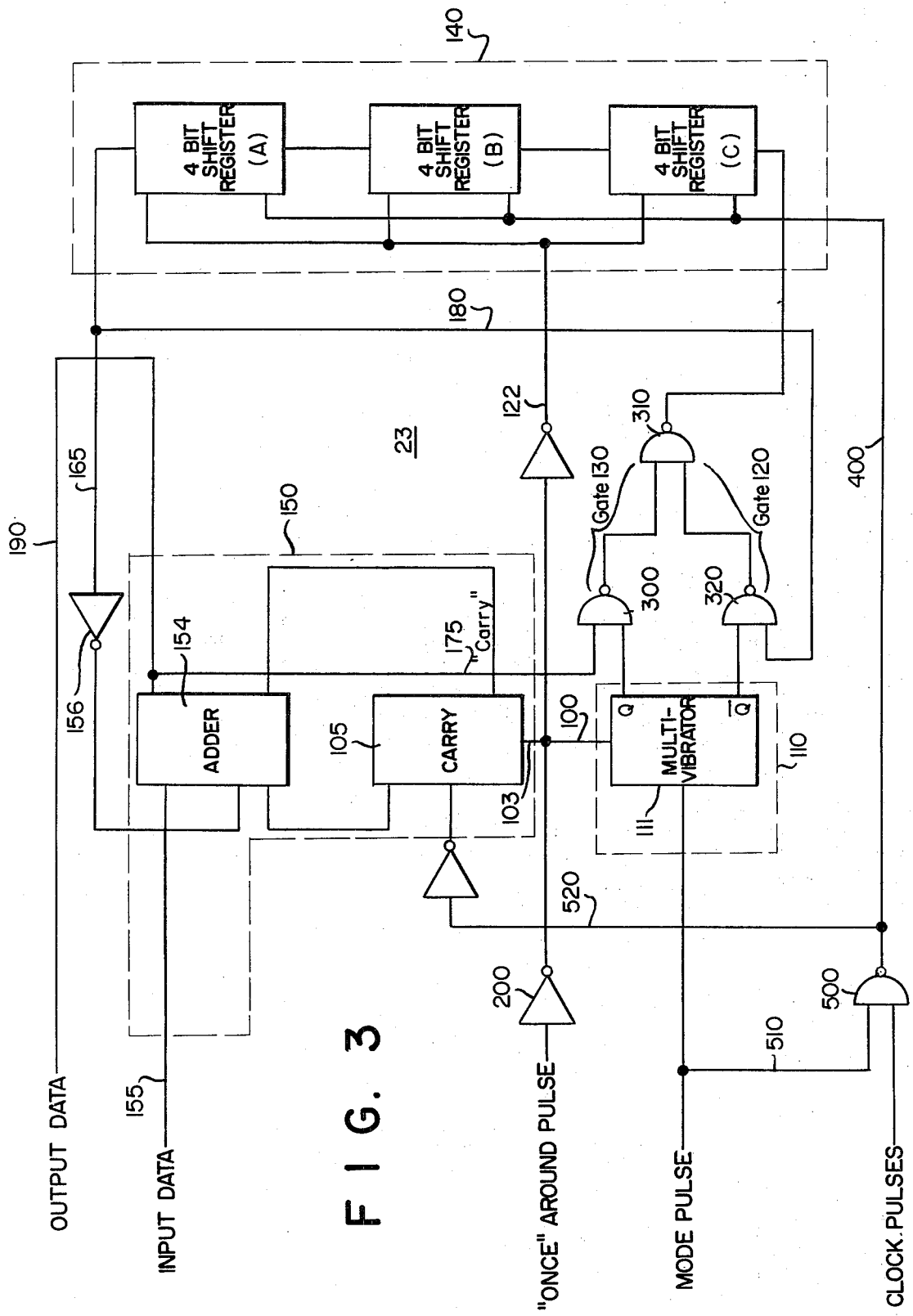

DIGITAL SUBTRACTION CIRCUIT FOR A CENTRIFUGAL CHEMICAL ANALYZER OF THE ROTATING SPECTROPHOTOMETER TYPE

The present invention is directed to a digital subtraction circuit for a centrifugal type chemical analyzer. More particularly, the present invention is directed to a digital subtraction circuit wherein the light absorbance value of a reference cuvette of the analyzer is subtracted from the light absorbance values of each of the other cuvettes of the analyzer.

In recent years, the need for rapid, automatic analytical devices has increased markedly, owing to the numerous microanalytical studies in biochemical research, routine clinical testing for physicians and hospitals, enzymatic studies, and the like. In addition to the increased demand for analysis, in certain fields it is often critical that a series of reactions be started at exactly the same time if reliable results are to be obtained. This is particularly important for enzymatic studies wherein detectable changes often take place after the reaction has proceeded for only a few seconds or minutes. However, few devices are available which can analyze sufficiently rapidly and accurately to handle the increasing number and varied tests desired by clinicians and research workers.

Recently, multistation analytical photometers which utilize a centrifugal field have become available for the rapid microanalysis of a wide variety of liquids such as blood serum and other body fluids, food products, and the like. Since numerous analysis can be performed rapidly and simultaneously, these devices are of particular interest wherein a large number of samples is involved or a variety of tests on one sample is desired. Moreover, since these devices allow the use of relatively small volumes of reagents, the use of expensive reagents can be minimized.

One such device which utilizes a centrifugal field in microanalytical studies is described in "Analytical Biochemistry," 28, 545–562 (1969) See also U.S. Pat. No. 3,586,484—Anderson and U.S. Pat. No. 3,681,029—Shapiro). This device employs the principle of doublebeam spectrophotmetry wherein absorbencies of a liquid sample and a reference solution are intercompared. The system is basically a series of cuvets arranged around the periphery of a rotor so that when it is spun, centrifugal force simultaneously mixes and transfers reagents and samples to the cuvets where an analysis is made spectrophotometrically. A sample loading disc is provided which contains rows of cavities arranged concentrically. Reagents are placed in the inner cavities, and the samples to be analyzed are placed in cavities at a greater radial distance than those containing the reagents. The sample loading disc is then indexed and positioned in the rotor with each individual reagent and sample system having a corresponding cuvet. As the rotor is accelerated, centrifugal force moves the reagent to the cavity containing the sample, where they are mixed and the mixture of reagent and sample is then moved through a communicating passage into the cuvet. The filled cuvets rapidly spin past the fixed light beam, and the transmission of light through the cuvets, i.e., through the samples, is measured.

In one mode of operation of this rotating photometric analyzer, one cuvet is employed as a reference cuvet, and it is filled with a reference liquid such as distilled water. The remaining cuvets will contain the samples to be analyzed by comparing the liquid in the reference cuvet with each of the sample liquids in the remaining cuvets individually. An analog circuit arrangement for accomplishing the foregoing is disclosed in U.S. Pat. No. 3,669,551—P. E. Bucher and T. Picunko assigned to Union Carbide Corporation. The present invention relates to an electrical circuit and a method to facilitate this purpose employing digital circuitry to provide increased versatility.

It is therefore an object of the present invention to provide a digital circuit for use in combination with a centrifugal type chemical analyzer whereby the light absorbance value of a reference cuvette of the analyzer is subtracted from the light absorbance values of each of the other cuvettes of the analyzer to provide referenced digital signals accurately representative of the extent of reaction in the cuvettes.

Figure 4:
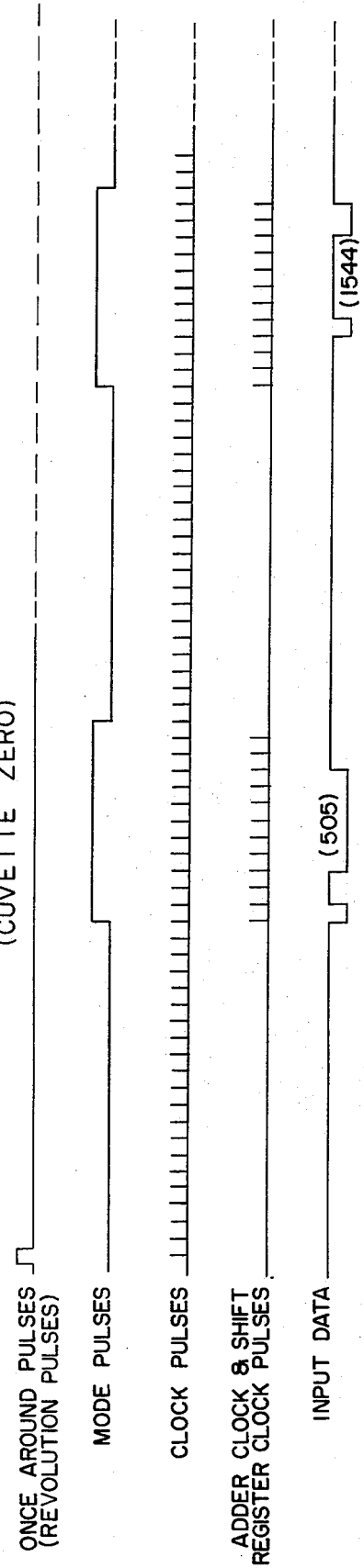
Figure 2:
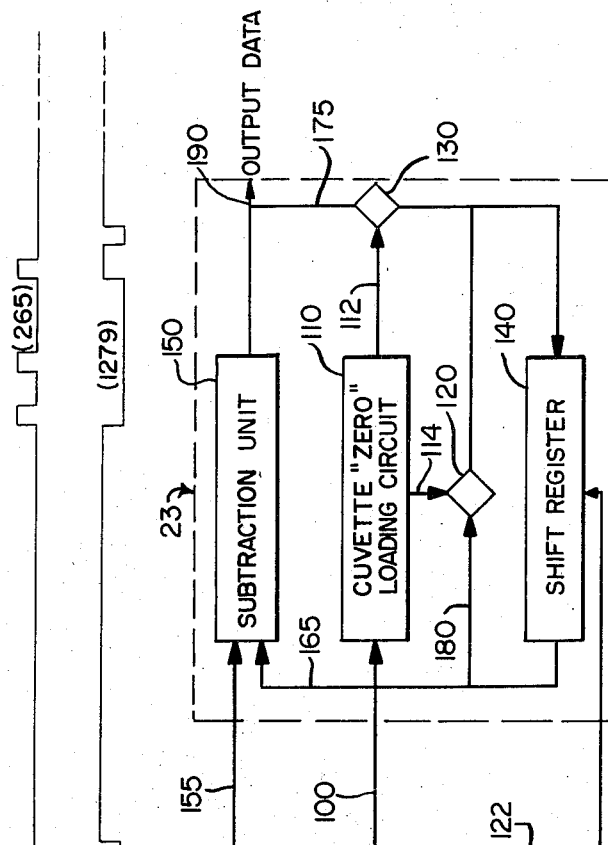
Figures 5, 5A:
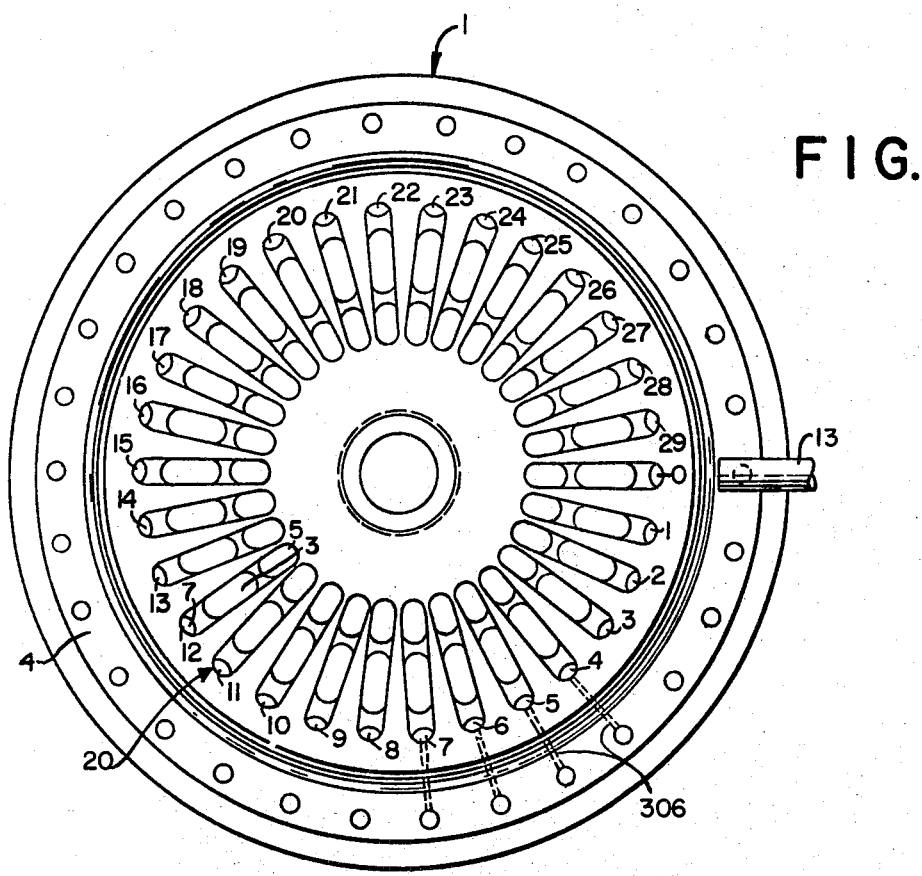

Other objects will be apparent from the following description and claims taken in conjunction with the drawing wherein FIG. 1 illustrates a block diagram arrangement for the subtraction circuit of the present invention in combination with a centrifugal type chemical analyzer FIG. 2 is a block diagram arrangement of the subtraction circuit of this invention FIG. 3 is a schematic of the subtraction circuit of the present invention FIG. 4 is a time diagram illustrating electric signals utilized and developed in the present invention and FIGS. 5 and 5(a) show a particular centrifugal type analyzer used in combination with the circuit of the present invention With reference to the drawing, FIG. 1 shows schematically a block diagram arrangement for obtaining light absorbance data from a centrifugal type chemical analyzer, e.g. of the type described in "Analytical Biochemistry," 28, 545–562 (1969). In FIG. 1, rotatable disc 1, for example suitably made from Teflon is shown having cavities 3 and 5 from which a liquid sample, i.e. blood serum, and a liquid reagent, are caused by centrifugal force, upon rotation of the rotatable disc 1, to pass into chamber 7 and mix and react in the communicating cuvette 9. A plurality of such cavity arrangements, e.g. 30, conveniently numbered 0 to 29 is provided around the rotatable disc 1 and communicate respectively with a plurality of radially aligned cuvettes 9 located in a ring member 4 and indexed with and affixed to the rotatable disc 1. The extent of the reaction in the plurality of cuvettes 9 is measured photometrically through the use of a light source 11 and a conventional photomultiplier detector 13 which supplies a repeated sequence of analog signals related to the light transmission of the liquid in the respective transparent cuvettes 9, to amplifier 15. Amplifier 15 is a logarithmic amplifier, conveniently a Philbrick Model 4351. The amplified analog signals, now related to the light absorbance of the liquid, indicated at 14 in FIG. 1, are conventionally converted to peak analog signals, using for example a peak detector 16 which can be a Peak Detector Module 4084/25 available from Burr-Brown Research Corporation. The resulting analog signals are transmitted to a conventional analog-to digital converter 21, e.g., a commercially available Fairchild Model 3751 for conversion to corresponding binary digital signals.

In certain operations of a centrifugal type analyzer of the type mentioned above, it is important to reference the electrical signals obtained from the cuvette light absorbance measurements. In such instances, a reference liquid of known light absorbance, e.g., distilled water, is provided in a given cuvette, conveniently designated cuvette "0". It is then desired to subtract the electrical signal corresponding to the light absorbance of the reference from the electrical signals of the remaining cuvettes to provide referenced data. In the present invention, with reference to FIG. 1, the binary data from Analog to Digital converter 21 is serially transmitted to the subtraction circuit of the present invention indicated at 23, with the binary data corresponding to cuvette "0" being transmitted first followed by cuvette "1", "2" etc. The referenced output binary data from subtraction circuit 23 is concurrently transmitted to conventional memory unit 26 and appropriately displayed by conventional printer 28. A timing function generator 25, of conventional design, including for example counters, shift registers, and combinatorial gating is synchronized with rotatable disc 1 and provides to subtraction circuit 23 synchronized signals (as hereinafter more fully described in connection with FIG. 4). These signals include clock pulses via connector 27, and a mode pulse via connector 29. Timing function generator 25 also provides a synchronized "revolution pulse" or "once around pulse" (i.e. one pulse per revolution of rotatable disc 1) via 31 to subtraction circuit 23.

In operation, with reference to the block diagram of FIG. 2 and the timing diagram of FIG. 4, the "once around" signal or "revolution pulse" from timing function generator 25 is initially applied via 100 to cuvette "zero" loading circuit 110 from which signals are provided via lines 112 and 114 to enable gate arrangement 130 and disable gate 120. Concurrently the "once around" signal is applied via line 122 to shift register 140 and an arbitrary binary data number, e.g., 240, is loaded in to the shift register 140 thus eliminating any previous data in the shift register. Following the transmission of the "once around" pulse, the binary data for each of the cuvettes, e.g. "0", "1" etc., are serially applied to subtraction unit 150 via line 155. As the binary data for cuvette "0" enters subtraction unit 150, the binary number, e.g. 240 previously loaded in the shift register 140 also enters subtraction unit 150 via line 165 and is subtracted from the value for cuvette "0". The resultant value is transmitted via line 175 and enabled gate 130 to shift register 140 where it is stored. Cuvette "zero" loading circuit 110 now disables gate 130 and enables gate 120. The next binary data applied to subtraction unit 150 (via line 155) is the unreferenced signal corresponding to the light absorbance of cuvette "1." As the binary input data for cuvette "1" enters subtraction unit 150, the "modified" value for cuvette "0" enters subtraction unit 150 from shift register 140 via line 165 and is concurrently re-circulated back to shift register 140 via line 180 and enabled gate 120. The result of the subtraction of the reference value from the data for cuvette "1," i.e., the referenced output data, appears at 190 and passes to memory unit 26 and printer 28 for display in a conventional manner. This subtraction, recirculation and output data transmission is repeated for each of the successive cuvettes "2", "3" etc.

The reason for initially subtracting an arbitrary value such as 240 from the value of the reference cuvette "0" is that there is a possibility that the light absorbance for some of the subsequent cuvettes may be quantitatively lower than that of the unmodified reference cuvette "0." In such circumstances, the subtraction of an unmodified reference value would give a non-positive result. This is avoided by subtracting a value from the initial value of cuvette "0" such that the resultant value is lower than the expected value of any of the other cuvettes. the number "240" is a convenient combination of binary bit values and is applicable for a large number of tests for which centrifugal analyzers are used. Other appropriate values can be determined as a matter of routine.

A particular embodiment of the present invention is illustrated in FIG. 3. With reference to FIG. 3, and the timing diagram of FIG. 4, a "once around" pulse is applied through a conventional inverter 200 via line 100 to cuvette "zero" loading circuit comprising a bistable multivibrator 111. (The same signal is applied via 103 to the carry circuit 105, for example a flip-flop to provide a 1-bit delay, of subtraction unit 150 to provide an initial "carry.") With Q of multivibrator 111 "high", $\bar{Q}$ is "low" and gate arrangement 130 is enabled. Gate arrangement 130 comprises conventional dual input NAND gate 300 and dual input NAND gate 310. At this time gate arrangement 130 comprising conventional dual input NAND gate 320 together with the aforementioned NAND gate 310 is disabled. The "once around" pulse is concurrently applied via line 122 to shift register 140 comprising for example three 4 bit pre-settable* shift registers (A), (B) and (C) arranged in cascade to provide a capacity of 12 bits. This capacity is chosen to correspond to the word length of the input data for each cuvette. Upon application of the "once around" pulse to shift registers (A), (B) and (C), (A) and (C) are set to "zero" and (B) is all "ones," providing a value of 240 in shift register 140. Units (A), (B) and (C) can be routinely arranged to provide other arbitrary values. Any previous data in shift register 140 is thus eliminated. Subsequent to the "once around" pulse input data for each of the cuvettes e.g., "0, " "1" etc. are serially applied via line 155 to subtraction unit 150 comprising a conventional adder 154 and carry 155 together with associated conventional inverter 156. As the binary input data for cuvette "0"enters adder 154, the 12 bit binary number 240 passes from shift register 140 via line 165 upon the application of shift register clock pulses via line 400 and conventional gate 500 which receives the mode pulse via line 510. The same clock pulses are applied to carry circuit 105 of adder 154 via line 520 entering the input data into subtraction unit 150. The value 240 is subtracted from the value for cuvette "0" in adder 154 and the resultant value is transmitted via line 175 and "enabled" gate 130 to shift register 140 where it is stored. Gate 130 is now disabled due to the state of the mode pulse and "once around" pulse applied at multivibrator 111 and gate 120 is enabled. The unreferenced binary input data next applied for cuvette "1" to adder 154 enters adder 154 via line 155 concurrently with the "modified" value for cuvette "0" (via line 165) upon the application of a mode pulse at 500. The "modified" reference value is simultaneously passed back into shift register 140 via line 180 enabled gate 120. The result of the subtraction, i.e. the output data, appears at 190 and thence the memory unit 26 and printer 28 as indicated in FIG. 1. This subtraction, recirculation and output data transmission is repeated for each of the successive cuvettes.

*Suitably Texas Instruments SN-7494 or comparable serial storage device.

With respect to subtraction unit 150, inverter 156 applies the complement of the value in the shift register 140 to adder 154 which, together with the initial "carry" previously mentioned, makes the adder output the difference between the input data and the shift register value.

A particular embodiment of the present invention involves the analyzer shown in FIGS. 5, and 5(a), in combination with the subtraction circuit arrangement illustrated in FIG. 3. The analyzer shown in FIGS. 5 and 5(a) of the type previously mentioned, comprises a rotatable loading disc 1 containing 30 rows of cavities indicated at 20 and numbered from 0 to 29, each row having a serum cavity 3, a reagent cavity 5, and a mixing chamber 7. Each row of cavities 20 is respectively aligned with a cuvette 9 in ring member 4. When the ring member 4 is driven, by motor 6, mixed serum and reagent are transferred through channels 306 to the respective cuvettes 9. The filled cuvettes 9 rotate rapidly between light source 11 and a conventional photomultiplier unit 13, e.g., at 1,000RPM and provide a sequence of analog electrical signals in the form of pulses, such as indicated at 14 in FIG. 1 to a conventional logarithmic amplifier 15. Thirty serial pulses are provided for each revolution of rotatable disc 1. The signals applied to the amplifier 15 are in the form of pulses due to the chopping effect of the rotation of cuvettes 9 between light source 11 and photomultiplier detector 13. A logarithmic amplifier is utilized due to the inherent logarithmic character of the absorbance phenomenon of serum-reagent reactions. The amplitude of the output pulses of amplifier 15, are a measure of the light absorbance, i.e., optical density of the liquid in cuvettes 9, and hence a measure of the state of reaction in the cuvettes 9. These pulses are applied via a conventional peak detector 16 to a conventional analog-to-digital converter 21 as previously mentioned in connection with the embodiment of FIG. 1. The output of analog-to-digital converter 21 is a sequence of thirty serial, binary words for each revolution of rotatable disc 1, with each word corresponding to the measured optical density of the reacting liquids in each cuvette 9. A calibration circuit as described in co-pending application "Calibration Circuit Suitable for Centrifugal Type Chemical Analyzer" Ser. No. 258,258 can be used to precisely conform the binary words to the appropriate optical density numerical value.

As shown in FIG. 5, a magnetic disc 600 of conventional design is affixed to shaft 610 of rotor assembly 4, which is driven at a predetermined speed e.g., 1,000 RPM by motor 6. Magnetic disc 600 can be routinely designed to have an incrementally, magnetically polarized surface whereby a plurality of uniformly spaced in time magnetic pulses are delivered to a conventional magnetic head detector 620. The magnetic pulses develop electrical pulses in magnetic head 620 which are applied to timing function generator 20. By well known techniques and using conventional circuitry the synchronized signals previously described are provided, i.e. clock pulses, and mode pulses. In a similar manner magnetic head 630 receives a magnetic pulse once each revolution of rotatable disc 1 and provides a synchronized revolution pulse.

With reference to FIG. 3, the signals developed as previously described are applied as indicated to the circuit illustrated in Figure in the time relationship shown in FIG. 4. The referencing of the data from the cuvettes 9 is accomplished as described in connection with FIG. 3.

The aforedescribed centrifugal analyzer, is of the type described in "Analytical Biochemistry," 28, 545–562 (1969).

A frequently performed analytical test using centrifugal analyzers is the determination of glucose in blood serum. In this analysis, 5 microliters of serum is placed in the serum cavities and 350 microliters of glucose reagent is placed in the reagent cavities of sample disc 1. The glucose reagent is a 0.3 molar triethanolamine buffer of pH 7.5 containing 0.0004 Mol/liter NADP, 0.0005 Mol/liter ATP, 70mg/liter hexokinase, 140 mg/liter glucose-6-phosphate dehydrogenase and 0.0004 mol/liter $MgSO_4$. The combined action of ATP (adenosine triphosphate) and NADP (nicotineamide adenine dinucleotide phosphate) in the presence of the enzymes hexokinase and glucose-6 phosphate dehydrogenase leads to the reduction of NADP which is followed spectrophotometrically by detecting changes in absorbance at wavelength of 340nm. The corresponding binary data obtained is compared with the referenced binary data for the reference cuvette containing for example, distilled water.

In FIG. 4, numerical values are shown for an exemplary subtraction and referencing in accordance with the present invention. A value of 505 is assumed for cuvette "0" from which the arbitrary value of 240 is subtracted to give a resultant of 265. The value 265 is thereafter subtracted from 1544 for cuvette "1" giving a resultant of 1279. The value of 265 is re-circulated and similarly subtracted from the input data values for the remaining cuvettes.

What is claimed is:

1. In combination with a photometric analyzer for the substantially simultaneous determination of the light transmission of plurality of discrete samples, comprising:

a. a power-driven rotor assembly including: (1) a plurality of sample analysis chambers at a common radial position in said rotor assembly, each of said sample analysis chambers having at least one light-transmitting means for permitting the passage of light therethrough; and (2) at least one storage chamber communicating with each of said sample analysis chambers to retain liquid when said rotor assembly is at rest, and to release said liquid to said sample analysis chamber when said rotor assembly is rotated;

b. a light source for providing a beam of light incident on said rotor assembly at a location station on said common radial position whereby said beam of light passes through each of said sample analysis chamber individually as the sample analysis chambers pass said location station during rotation of said rotor assembly;

c. detecting means for measuring the intensity of said beam after it has passed through said sample analysis chamber individually, said detecting means including means for generating an electrical pulse each time one of said sample analysis chamber passes said location, each said electrical pulse being proportional to the measured intensity of said beam, and d. means for converting each of said electrical pulses into electrical pulses corresponding to the light absorbance for each sample analysis chamber, the improvement which comprises i. means for converting each of said electrical pulses corresponding to light absorbance to an electrical signal in binary form and provide a serial sequence of binary input data signals corresponding to light absorbance ii. means for providing an electrical revolution pulse for each revolution of said rotor assembly iii. serial storage means arranged to receive said revolution pulse and store a predetermined binary number value in response thereto iv. subtraction means arranged to receive a predetermined binary input data signal in said sequence of binary input data signals concurrently with a binary electrical signal from said serial storage means corresponding to the predetermined binary number value stored therein and provide a first output binary electrical signal equal to the difference of said input data signal and said signal from said serial storage means, v. first gating means arranged to transmit said first output binary signal to said serial storage means, vi. means arranged to transmit said first difference signal from said serial storage means to said subtraction means concurrently with each subsequent binary input data signal and provide a binary output data signal for each said subsequent binary input data signal equal to the difference between such input data signal and said first difference signal and vii. second gating means for re-circulating said first difference signal to said serial storage means.

* * * * *